(12) United States Patent
Batchman

(10) Patent No.: US 10,472,183 B1
(45) Date of Patent: Nov. 12, 2019

(54) CYLINDER SINGULATOR APPARATUS AND SYSTEM

(71) Applicant: Jeffrey A. Batchman, Visalia, CA (US)

(72) Inventor: Jeffrey A. Batchman, Visalia, CA (US)

(73) Assignee: Exeter Engineering Inc., Exeter, CA (US)

( * ) Notice: Subject to any disclaimer, the term of this patent is extended or adjusted under 35 U.S.C. 154(b) by 0 days.

(21) Appl. No.: 16/016,480

(22) Filed: Jun. 22, 2018

Related U.S. Application Data

(60) Provisional application No. 62/674,602, filed on May 21, 2018.

(51) Int. Cl.
  *B65G 47/68* (2006.01)
  *B65G 47/52* (2006.01)

(52) U.S. Cl.
  CPC ...... *B65G 47/68* (2013.01); *B65G 2201/0211* (2013.01); *B65G 2201/04* (2013.01)

(58) Field of Classification Search
  None
  See application file for complete search history.

(56) References Cited

U.S. PATENT DOCUMENTS

| | | | |
|---|---|---|---|
| 4,049,111 A * | 9/1977 | Mosterd | A01K 43/00 198/445 |
| 7,210,568 B2 * | 5/2007 | Cull | B65G 47/088 198/442 |
| 7,278,530 B2 | 10/2007 | van Wijngaarden et al. | |
| 7,311,191 B2 | 12/2007 | Bahr | |
| 8,776,986 B2 | 7/2014 | Morley | |
| 2007/0068772 A1 | 3/2007 | Bahr | |
| 2008/0041697 A1 * | 2/2008 | Jacob | B65B 21/04 198/445 |

* cited by examiner

*Primary Examiner* — Kavel Singh
(74) *Attorney, Agent, or Firm* — Richard A. Ryan

(57) ABSTRACT

A singulator apparatus and system for use with a product conveying and/or sorting system to place products in a single layer line of such products that are also separated from each other so the products may be more effectively and efficiently sized, inspected, sorted or otherwise processed in the processing area of the conveying and/or sorting system. The singulator apparatus has at least one pair, preferably a plurality, of adjacent cylindrical assemblies that are linearly aligned to be parallel with each other and define a valley between the adjacent cylindrical assemblies. Jumbled products are directed to the valleys from a product transfer area that receives the products. The cylindrical assemblies each have a cylindrical member and a shaft, with the shaft connected to a rotating mechanism that rotates the cylindrical assemblies to singulate and separate the products as they move along the valley between cylindrical assemblies.

18 Claims, 8 Drawing Sheets

CYLINDER SINGULATOR APPARATUS AND SYSTEM

CROSS-REFERENCE TO RELATED APPLICATIONS

This patent application claims priority to U.S. Provisional Patent Application Ser. No. 62/674,602 filed May 21, 2018.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The present invention generally relates to apparatuses and systems utilized with conveying systems to singulate items to be sorted into individual rows of items from a bulk delivery of such items for inspection and other item handling purposes. More particularly, the present invention relates to conveyor apparatuses and systems that are utilized to singulate a bulk supply of items into rows for further processing of the items. Even more particularly, the present invention relates to singulators that are particularly configured to singulate cylindrically-shaped items, such as certain fruits and vegetables.

B. Background

As is generally well known, many products are available in a wide variety of different sizes and shapes and levels of quality that must be reviewed, sized and selected based on those, and other, characteristics. This is particularly true with regard to food products, including fresh, dried or processed fruit and vegetables (collectively referred to as "produce"), which must be sorted into different classifications with regard to various specific characteristics for the different types of food products. In fact, prior to arriving at the retailer, virtually all fresh produce is sized and sold either by size or by a combination of size and quality. Depending on the particular produce item, size may mean a diameter, or a diameter/length combination or a volume/weight combination. Some vegetable items may be sized manually, such as a head of lettuce, but the vast majority of produce is sized automatically as it transits a mechanical or a electro/mechanical device. In the sorting industry these devices are commonly referred to as "sizers" or "graders". These terms are often used interchangeably. Most modern sizers incorporate technology which will also make a determination regarding surface defects or color consistency.

In general, product handling and sorting activities for the discrimination of individual product units have been in use for some time, particularly in the food product industry. Discrimination of product units in the food industry is generally based on certain selected product qualitites, including such qualities as the size, ripeness and color of the product and/or the amount and type of blemishes and the like on the product. Until somewhat recently, the handling and sorting of products, particularly food products, was primarily accomplished through the use of manual labor by having products conveyed past workers at individual work stations so the workers could review and separate products based on the selected criteria for that product. A principal benefit of manual labor is the versatility of the worker in being able to handle and make selections for different types of products. As is well known in the food industry, however, such labor has become generally more expensive and, due to its seasonal nature, it can be somewhat unreliable with regard to consistency. Due to the difficulties in finding experienced seasonal workers and the normal administrative problems associated with a fluctuating work force, there has been a need for less labor intensive systems. For instance, in the Central Valley of California, some citrus packing houses will process approximately 2,000,000 individual oranges in an eight hour day, which is virtually impossible to do manually. Using a modern electro-mechanical sizer, however, such quantities are the norm.

With regard to automated product handling systems for the food industry, the nature, volume, relative unit cost and variety of different types of food products severely inhibits the ability to design product handling equipment that is uniformly applicable to different foods. Due to the nature of such food products, particularly most fresh fruit and vegetables, the products must be handled with great care to avoid damage to the product that would reduce its market value or, in some cases, its ability to be sold. In addition, the perishable nature and large quantities of products that need to be processed in a short period of time after harvesting makes rapid processing of the food products an economic necessity. However, due to the varied nature of food products, it is difficult for the average food processor to economically justify food processing equipment that is suitable for processing only a very limited type of food product (i.e., one type of fruit or vegetable). As a result, it is generally preferred that any automated food handling equipment that is intended to replace the versatility of the human worker must be configured for use with a number different types of food products. Unfortunately, due to the varied characteristics of food products, this places great demand for versatility on the equipment.

The availability of relatively inexpensive yet high powered computers and computer related and controlled equipment and the ability to use such equipment with ever improving optical sensing equipment has benefited numerous product handling industries, including the food industry. The use of these computers and optical sensors, and the relatively sophisticated software available for such computers and sensors, has vastly improved the capability for detecting the size and condition of individual product units and distinguishing between the units based on the desired selection criteria. This equipment is used with conveyor lines that move the product into position for scanning and then move the product to a storage or shipping container that is appropriate for the category of product (i.e., based on the selection criteria). In conjunction with the equipment to optically scan and characterize products, the handling equipment requires the use of responsive mechanisms that rapidly respond to commands from the computerized equipment so as to off-load products from the conveyor system into the appropriate container. If the product fails to meet the minimum allowable criteria for the particular type of product, it is generally conveyed to a separate container or location for discarding or processing in another manner.

Automated responsive mechanisms suitable for off-loading products in response to commands from the computer and optical scanning equipment require a somewhat exacting placement of individual product units relative to the responsive mechanism, sufficient separation of product units from each other, proper orientation, and if necessary reorientation, of the product unit relative to the responsive mechanism and an ability to quickly separate the product unit from the conveying line. In fact, virtually all modern electro/mechanical sizers require each individual product be separated from (i.e., not touching) the adjacent product to allow each product to be independently evaluated. If one product is touching another product, then the computer analysis is likely to include both products. Instead of weighing or measuring or judging the surface of one product, the sizer is actually dealing with two, so the result may be totally false. Although there are algorithms that allow the sizer to default when it thinks it is dealing with more than one product, this usually results in both products being rejected. Typically, both products will be recycled, which subjects the product to extra handling and thus the opportunity for injury, particularly with regard to fresh produce, and impacts the sizers volume because it is continuously examining recycled products.

The inability to create separation between products causes what is referred to as "over-the-end", meaning recycled, which is a major problem. Some products, such as oranges, are easier to deal with than other products/produce or commodities because oranges and the like roll easy. Many products do not roll so easy. For instance, most potato varieties, bell peppers, cucumbers, corn and the like don't roll at all and these products tend to override one another, meaning one product will overlap the other.

Companies that sort and inspect products generally recognize that to rapidly inspect products and reduce the over-the-end problem, it is necessary to align the products in a single line, which is commonly referred to as to singulate the products or singulation. Machines that place the products in single line are commonly referred to as singulators. One of the biggest problems any singulator has is getting the product aligned and only one deep. Often products are delivered onto a singulator in a "jumbled" mess, often maybe six or more deep. A singulator has to reduce this "jumble" to a linear arrangement that is a single item deep with the product not overlapping or touching one another.

Originally, several major manufacturers provided a "time and turn" table to singulate oranges prior to the sizer, in which an effort was made to deliver an orange into a moving cup and then transfer the orange from the cup to the sizer. Unfortunately, there was no way to insure that each cup got filled or that only one orange landed in each cup. As a result, anywhere from four to eight people were required along the table to try to insure that the cups were correctly filled. There is no way a sizer with a "time and turn" table can work without people.

The most common method of singulation in recent years is to use a "V" belt singulator, which comprises two belts aligned in a "V" shape. During use, an orange will fall into the "V" and be carried along, typically for four to six feet. Oranges that are doubled up will usually find a spot. Although the oranges may be touching on the "V" belt, the secret is to have the sizer running at a faster rate than the "V" belt and a separation occurs when the orange is delivered from the "V" belt to the sizer. This system usually works fairly well and requires no people. It is, however, only effective approximately 60% to 70% of the time. Unfortunately, the effectiveness rate drops significantly for non-round products, particularly produce and the like having a generally oblong or flat shape, such as cucumbers, corn and some varieties of potatoes and bell peppers.

In one type of singulation system, a jumbled mass of products (such as oranges or the like) are received onto a vibrating or shaker conveyor that has channels and vibrates. The vibrator help creates a single layer of oranges from the mass and aligns them to fall onto "V" belts. The "V" belts then deliver the oranges to a sizer transport system. The rate the oranges come down the vibrator is slower than the lineal rate of the "V" belt, which it itself slower than the rate of the transport system of the sizer. As the oranges transfer from one system to another, there tends to be a gap created between adjacent oranges.

Although the prior art discloses product handling systems for handling, sorting and singulating many types of items, none of the presently known product handling systems have singulators that are particularly suitable for singulating produce or the like having an oblong or flat shape. What is needed, therefore, is an improved apparatus and system for singulating products that can quickly, efficiently and effectively singulate products that have round or non-round shapes so the products can be further processed. More specifically, a new singulator apparatus and system should be able to receive products from a product receiving area that has products in a jumbled mess, place the products in a single, linear line and then direct the single-lined (singulated) products to a processing area for one or more further processing steps, such as orientating, inspecting and the like. The new singulator apparatus and system should be adaptable for a wide variety of different types of products, including those having non-round shapes. Preferably, any such singulator apparatus and system should be cost effective to manufacture and use and be efficient with regard to floor space constraints.

SUMMARY OF THE INVENTION

The singulator apparatus and system of the present invention provides the benefits and solves the problems identified above. That is to say, the present invention is directed to a singulator apparatus and system which are beneficially configured to be utilized as part of a product conveying and processing system that receives, singulates, reviews and sorts product. More specifically, the singulator apparatus and system of the present invention are utilized as part of a conveying and processing system that receives products in a jumbled, non-linear manner into a product receiving area and then directs the products to a singulating area defined by the new apparatus and system where the apparatus linearly aligns the products in a one-product deep arrangement so that the products may then be directed along the conveying system for further processing, such as sorting, orientating, inspecting and the like. The apparatus and system for singulating products of the present invention are able to quickly, efficiently and effectively singulate products that have round or non-round shapes, including produce having such as corn, bell peppers, cucumbers and the like. Use of the new singulator apparatus and system significantly reduces the likelihood that products will be have to be recycled through the conveying system. In the preferred embodiments of the present invention, the new singulator apparatus and system are cost effective, in the context of conveyor systems, to manufacture and use and are efficient with regard to the typical floor space constraints of a facility where the receiving, sorting and other inspection of product takes place.

The singulator of the present invention utilizes revolving cylinders and V-shaped doghouses to position the products in a linear arrangement. When a pile of products are dropped onto the revolving cylinders from the product receiving area, the products align themselves in the valleys between the cylinders, creating a space between each item and eliminating one piece overriding another. Although the new singulator works whether the product is oblong or round, persons skilled in the art will readily appreciate that the new apparatus and system will be particularly beneficial for oblong or flat items because nothing else works well. Preferably, the cylinders have variable speed control to allow the cylinders to be adjusted so as to be most effective for different types of products. In one embodiment, the new singulator can include a tilt mechanism that allows the operator to change the angle of the cylindrical assemblies by raising or lowering either the first/upstream end of the apparatus and/or the second/downstream end of the apparatus. The length and diameter of the cylinders to achieve the most effective and efficient singulation of the products will also vary for different types of product.

In one of the preferred embodiments, brushes are likely to be the preferred cylinder material, as revolving brushes appear to work well and they tend to have a cushioning effect on the product when it is delivered onto the cylinders. However, there are probably circumstances when a smooth, revolving cylinder may be the preferred configurations. As generally well known in the art, some produce particularly those which are packed in a more advanced stage of maturity, tend to be juicy or sticky. These produce can create a mess that may contaminate the brushes. As can be readily appreciated by persons who are skilled in the art, smooth cylinders can be more easily cleaned than brushes and, as a result, may be best suited for such produce.

In one embodiment of the present invention, the cylinder singulator apparatus generally comprises a product transfer area at a first end of the apparatus, a product delivery area at a second end of the apparatus, a singulation area disposed between the product transfer area and the product delivery area and a rotating mechanism. The product transfer area of the apparatus is structured and arranged to receive the plurality of jumbled products, typically from a conveyor assembly associated with the conveying and/or sorting system with which the apparatus is being utilized. The product delivery area of the apparatus is structured and arranged to deliver the plurality of singulated products to the processing area of the conveying and/or sorting system. The singulation area has a plurality of cylindrical assemblies positioned between the first and second ends of the apparatus to define one or more pairs of adjacent cylindrical assemblies. Each cylindrical assembly has a cylindrical member. Each pair of adjacent cylindrical assemblies are linearly aligned to define a valley therebetween that is sized and configured to receive the plurality of jumbled products and to allow the cylindrical members of the pair of adjacent cylindrical assemblies to rotatably engage each of the products to singulate and separate the products to produce the plurality of singulated products and to move the plurality of singulated products along a singulation path to the product delivery area for further processing. The rotating mechanism is operatively connected to each of the cylindrical assemblies to rotate the cylindrical assemblies.

In a preferred embodiment, the new apparatus of the present invention also comprises a support frame having one or more frame members. The product transfer area can comprise one or more infeed delivery plates that are each sized and configured to facilitate transfer of the jumbled products one or more valleys between the pair of adjacent cylindrical assemblies to the singulation area. The product delivery area can comprise a delivery chute that associated with at least one of the valleys between the pair of adjacent cylindrical assemblies, with the delivery chute being configured to receive the singulated products from the singulation area and direct them to the processing area. Typically, each of the cylindrical assemblies will comprise a shaft that is attached to or integral with the cylindrical member thereof. In this configuration, the rotating mechanism will be operatively connected to the shaft to rotate the cylindrical member. A bearing assembly will usually be associated with at least one of a first end and a second end of each of the cylindrical assemblies, typically both ends, to allow each of the cylindrical assemblies to rotate relative to a frame member on which the bearings are mounted. In one configuration, the rotating mechanism comprises a rotation producing device that is configured to produce rotating motion and one or more rotating devices that operatively interconnect the rotation producing device and the cylindrical assemblies to rotate one or more of the cylindrical assemblies upon rotation of the rotating producing device. The rotating mechanisms can comprise a rotating device connector that is associated with the rotation producing device and each of the rotating devices and cylindrical assemblies to transfer rotating motion from the rotation producing device to the cylindrical assemblies. The apparatus can also include one or more doghouses, with each of the doghouses being structured and arranged to direct the plurality of jumbled products into the valleys between pairs of adjacent cylindrical assemblies and to keep the plurality of singulated products in the valleys.

In another embodiment of the present invention, the cylinder singulator system comprises a conveyor assembly having a conveyor that defines a product receiving area for receiving a plurality of jumbled products, a processing area for processing a plurality of singulated products (i.e., inspecting, sizing, sorting and the like) and the above-described cylinder singulator apparatus.

Accordingly, the primary object of the present invention is to provide a new singulator apparatus and system for singulating products that have the various advantages discussed above and elsewhere in the present disclosure and which are able to overcome the disadvantages and limitations that are associated with presently available apparatuses and systems for singulating products.

It is an important objective of the present invention to provide a new singulator apparatus and system that, when utilized with a conveying and/or sorting system, is structured and arranged to receive a plurality of jumbled products and quickly, efficiently and effectively singulate the products by separating the products and placing such products in a linear configuration so the products may be more effectively further processed by the conveying and/or sorting system.

An important aspect of the present invention is that it provides a new singulator apparatus and system which achieves the goals of the above-described objectives.

Another important aspect of the present invention is that it provides an improved singulator apparatus and system which is structured and arranged to be utilized with a product conveying and/or sorting system so as to position a plurality of the products in a linear configuration for ease of accomplishing one or more further processing objectives, such as sizing, sorting, inspecting and the like.

Another important aspect of the present invention is that it provides an improved singulator apparatus and system which is structured and arranged to receive a plurality of jumbled products and singulate the products by separating them from each other and placing the products in a linear configuration so each of the products may be more efficiently and effectively processed by a conveying and/or sorting system configured to process such products.

Another important aspect of the present invention is that it provides a new cylinder singulator apparatus and system which are utilized as part of a conveying and processing system that receives a plurality of jumbled products in a product receiving area and then directs the products to a singulating area where the new singulator apparatus and system separate and linearly position the products in a one-product deep configuration so that the products may then be directed along the conveying system for further processing.

Another important aspect of the present invention is that it provides a new cylinder singulator apparatus and system which are adaptable for use with a wide variety of different types of products, including products having non-round shapes, including produce such as cucumbers, corn, bell peppers and the like, and which reduces the likelihood that such products will be have to be recycled back through the conveying system.

Yet another important aspect of the present invention is that it provides a new cylinder singulator apparatus and system that are cost effective, in the context of conveyor systems, to manufacture and use and are efficient with regard to floor space constraints of a typical product processing facility.

As will be explained in greater detail by reference to the attached figures and the description of the preferred embodiments which follows, the above and other objects and aspects are accomplished or provided by the present invention. As set forth herein and will be readily appreciated by those skilled in the art, the present invention resides in the novel features of form, construction, mode of operation and combination of components and/or processes presently described and understood by the claims. The description of the invention which follows is presented for purposes of illustrating one or more of the preferred embodiments of the present invention and is not intended to be exhaustive or limiting of the present invention. As will be readily understood and appreciated by persons skilled in the art, the scope of the invention is only limited by the claims which follow after the discussion.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures are illustrative of several potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular materials, shapes and configurations for the various components of the apparatus and system of the present invention and a conveying/sorting system and products with which the new invention can be utilized, persons who are skilled in the art will readily appreciate that the present invention is not so limited. In addition, the exemplary embodiments of the present device are shown and described with only those components which are required to disclose the present invention. It may be that some of the necessary elements for attaching and using the present invention are not shown or are not necessarily described below, but which are well known to persons skilled in the relevant art. As will be readily appreciated by such persons, the various elements of the present invention that are described below may take on any form consistent with forms that are readily realized by persons of ordinary skill in the art having knowledge of singulators and conveyors utilized with product conveying, sorting, inspecting and processing systems. Likewise, the present invention is not limited to the types of conveyors, cylinders or other materials and/or components that are set forth below.

Figure 1:
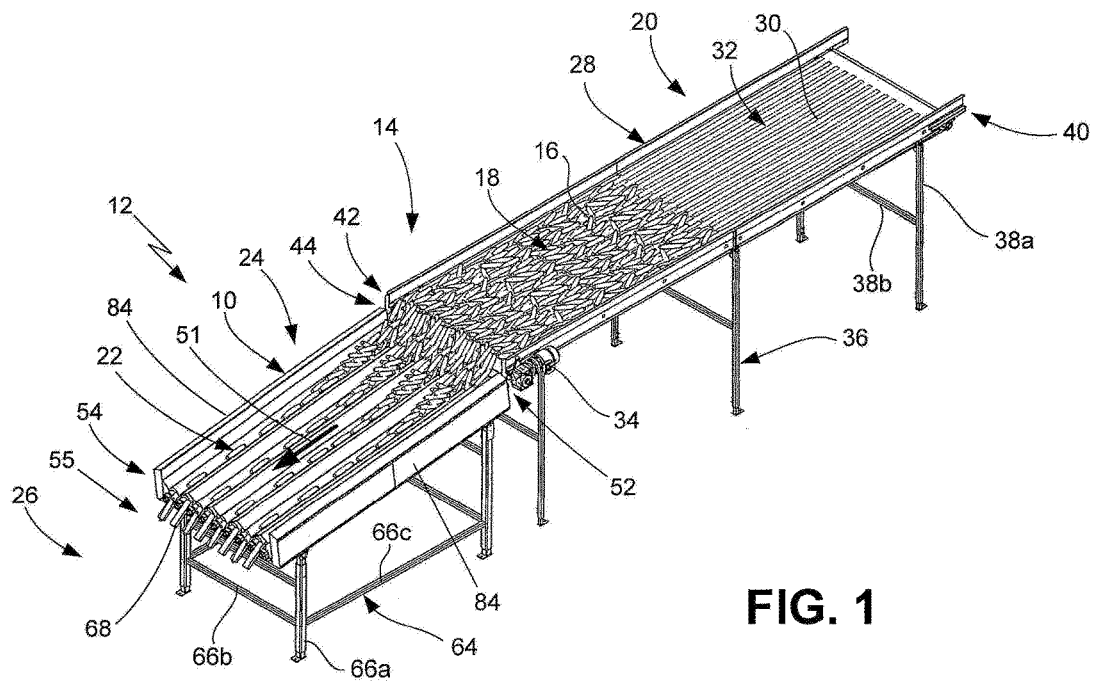
FIG. 1 is a left side perspective of a cylinder singulator apparatus and system that is configured according to one of the preferred embodiments of the present invention, with the new singulator apparatus shown in use with a conveying system that distributes jumbled product to the apparatus and with the product shown being singulated by the apparatus.
Figure 2:
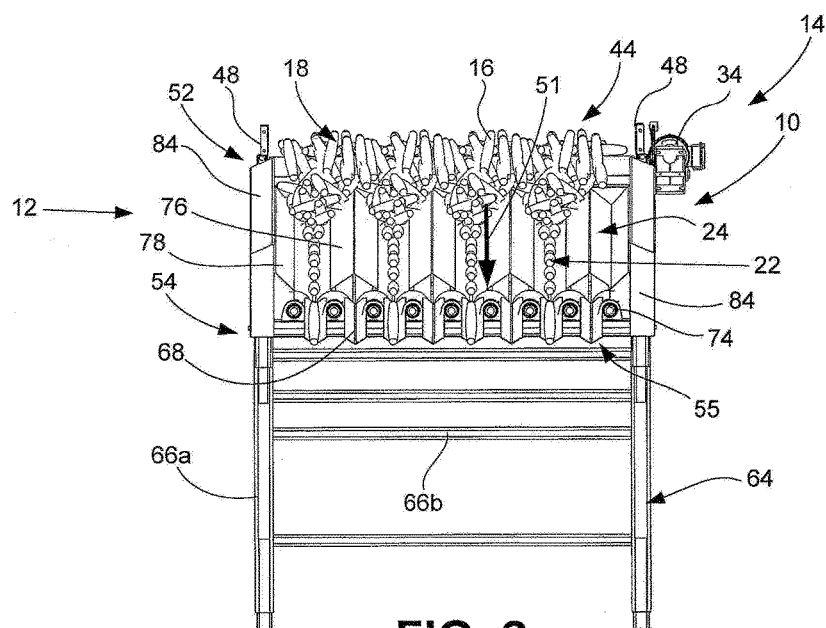
FIG. 2 is a front view of the cylinder singulator system of FIG. 1.

A new cylinder singulator apparatus that is configured pursuant to one or more of the preferred embodiments of the present invention is shown generally as 10 in FIGS. 1-8. A new cylinder singulator system, which utilizes the new singulator apparatus 10, is shown generally as 12 in FIGS. 1-7. The singulator apparatus 10 of the present invention is structured and arranged to be utilized with a typical conveying, sorting and/or processing system 14 that is utilized to convey, sort and/or process product 16, such as the cucumbers shown in FIGS. 1 and 2, by size, weight, quality, ripeness and/or other factors. As also shown in FIGS. 1 and 2, the new singulator apparatus 10 and system 12 are structured and arranged to receive a plurality of jumbled products 18 from a product receiving area 20 that is connected to, directly or indirectly, the singulator apparatus 10 and then quickly, efficiently and effectively singulate the products 16, with the singulated products shown as 22 in FIG. 1, by separating the individual products 16 from each other and placing the products 16 in a generally linear, spaced apart configuration so each product 16 may be more efficiently and effectively further processed by the prior art conveying and/or sorting system 14.

As set forth in more detail below, the new singulator apparatus 10 and system 12 of the present invention define a singulation area 24 that receives a plurality of products 16 as jumbled products 18 (i.e., products 16 in a non-linear jumbled arrangement) from the product receiving area 20 and then directs the singulated product 22 to a processing area 26 for further processing by the facility's normal conveying and/or sorting system 14, as shown in FIGS. 1-7. Although no equipment, machines and/or associated materials are shown in the processing area 26, persons who are skilled in the relevant art will readily appreciate that the processing area 26 will comprise equipment, machines and/or associated materials that are selected to accomplish the various objectives of the conveying and/or sorting system 14, which may include such tasks as orientating, weighing, sizing, inspecting, sorting and the like. The new singulator apparatus 10 and system 12 of the present invention linearly aligns each of the products 16 in a one-product deep configuration, as shown in FIG. 1, so that the products 16 may be directed to the processing area 26 for the further processing. As will also be readily appreciated by persons who are skilled in the relevant art, the new singulator apparatus 10 and system 12 will allow a conveying and/or sorting system 14 to more effectively and efficiently inspect products and will significantly reduce the over-the-end problem that frequently causes product 16 to be recycled.

The product receiving area 20, which receives the jumbled products 18, has a conveyor assembly 28 comprising a conveying member 30 (such as a conveyor belt or the like) defining a conveyor surface 32 on which the jumbled products 18 are received, a conveyor motor 34 configured to mobilize conveying member 30 and a conveyor support frame 36 that supports the conveying member 30 on the surface (such as floor) of the facility having the conveying and/or sorting system 14 with which the singulator apparatus 10 and system 12 are utilized, as best shown in FIGS. 1-4. As also shown in these figures, the typical conveyor support frame 36 comprises a plurality of frame members 38, including various leg members 38a and transverse members 38b. The conveyor support frame 36 may include a variety of other frame members 38, including cross-members and angled supports. The conveyor assembly 28 has a first or upstream end 40 where a plurality of jumbled products 18 are received and a second or downstream end 42 that is connected, directly or indirectly, to the singulator apparatus 10 and where the jumbled products 18 are transferred to the singulation area 24 of the singulator apparatus 10 so the jumbled products 18 can be formed into the singulated products 22 that are then directed to the processing area 26.

Figure 3:
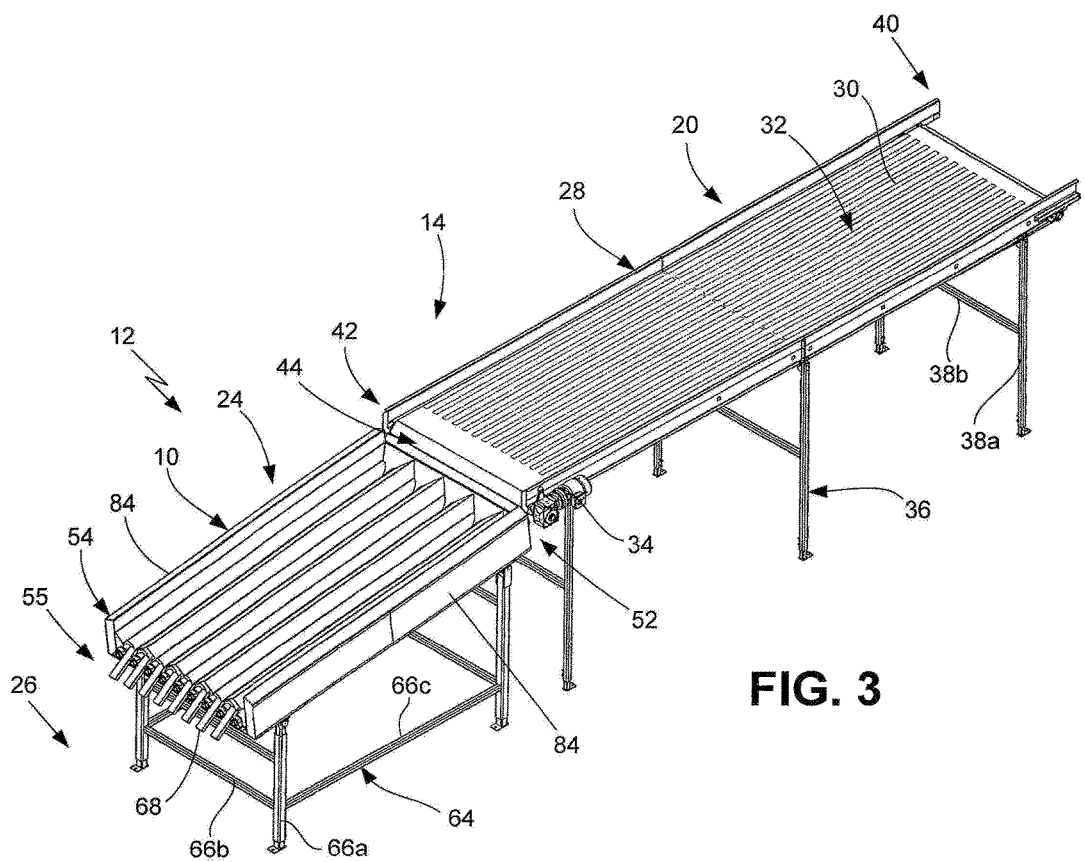
FIG. 3 is a left side perspective of the cylinder singulator apparatus and system of FIG. 1 shown without the product.
Figure 4:
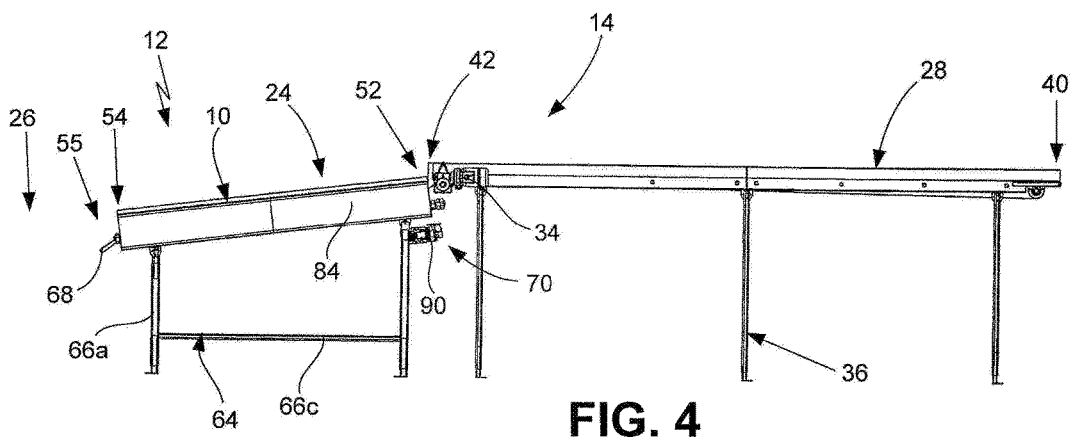
FIG. 4 is a left side view of the cylinder singulator apparatus and system of FIG. 3.
Figure 5:
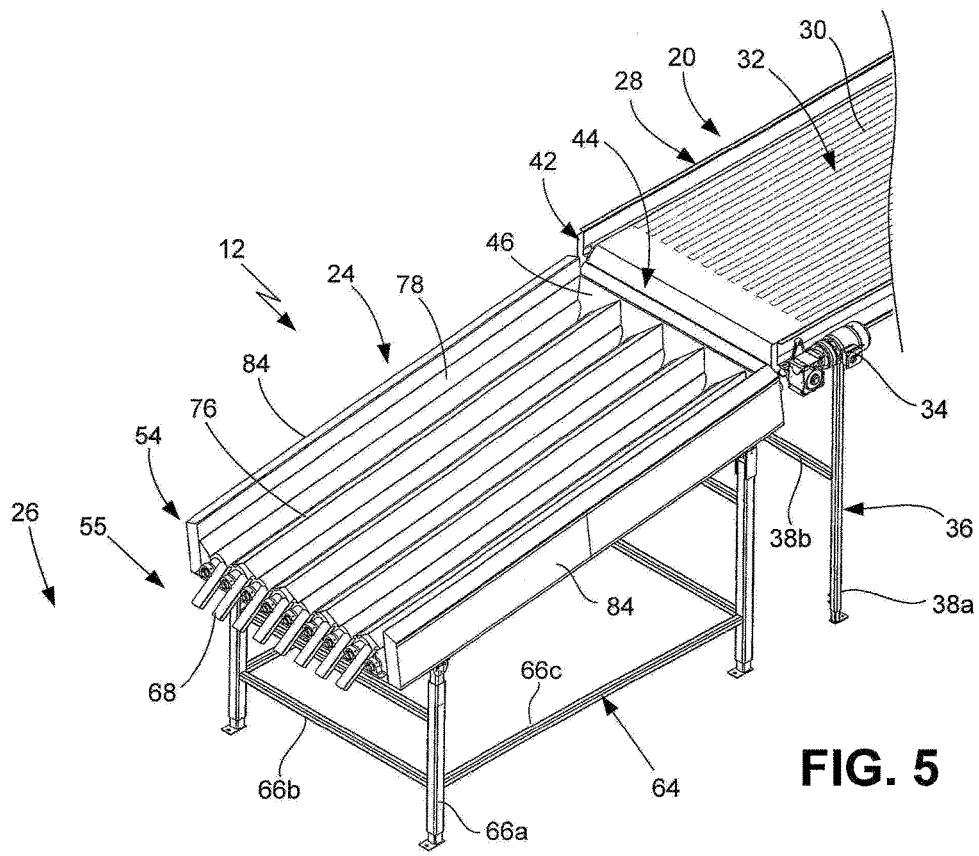
FIG. 5 is an isolated left side perspective view of the cylinder singulator apparatus and system of FIG. 3 emphasizing the new singulator apparatus.
Figure 6:
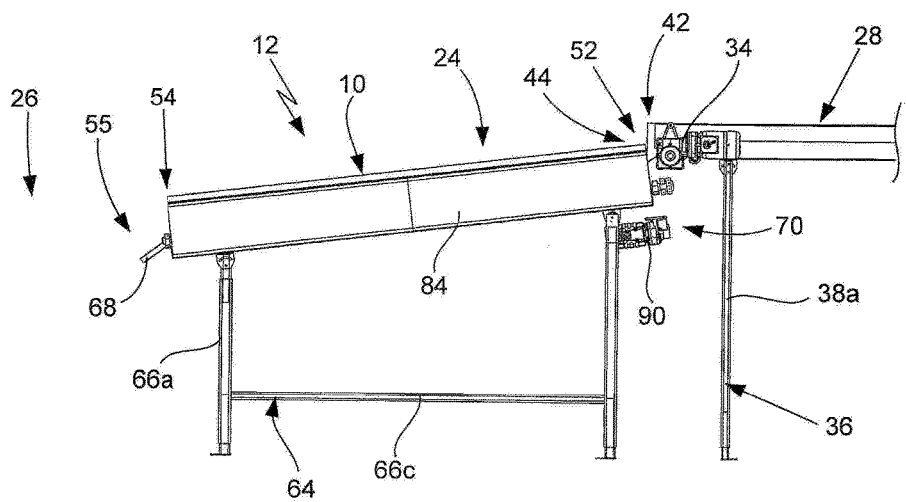
FIG. 6 is a left side view of the cylinder singulator apparatus and system of FIG. 5.
Figure 7:
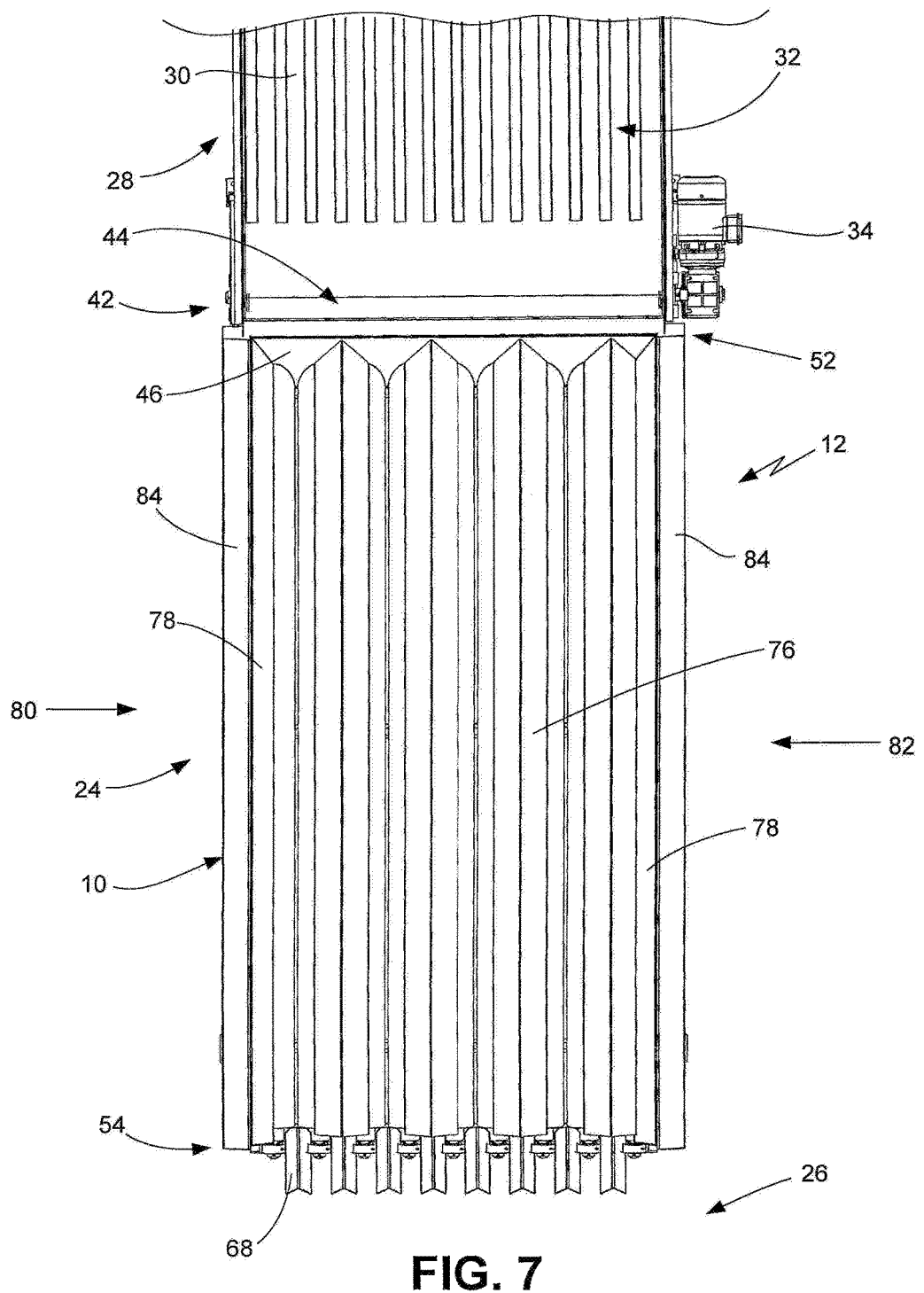
FIG. 7 is a top view of the cylinder singulator apparatus and system of FIG. 5.

For purposes of describing the apparatus 10 and system 12 present invention, the first/upstream end 40 is the end of the conveyor assembly 28 from which products 16 are conveyed toward the second/downstream end 42, which is where the products 16 are transferred to the apparatus 10 and system 12. Typically, but not necessarily required, the first/upstream end 40 will be positioned physically higher than the second/downstream end 42, as best shown in FIGS. 1 and 3. As will be readily understood by persons skilled in the relevant art, a wide variety of different types of conveyor assemblies 28, including conveying members 30, conveyor surfaces 32 and conveyor motors 34, can be utilized with the apparatus 10 and system 12 to transfer jumbled products 18 thereto.

The connection area between the conveyor assembly 28 and the singulator apparatus 10 is defined as the transfer area 44, best shown in FIGS. 1 and 3-7, where the jumbled products 18 are moved to the singulator apparatus 10 for singulation into singulated products 22. The transfer area 44 has an infeed delivery plate 46 that allows the products 16 to more efficiently transition from the conveyor assembly 28 to the apparatus 10. For conveying and/or sorting systems 14 that are utilized for processing produce, such as the cucumbers shown in FIGS. 1 and 2, the infeed delivery plate 46 will typically be made out of stainless steel or other food grade materials to prevent contaminating the produce 16 as it passes through to the singulator 10. As set forth in more detail below, the infeed delivery plate 46 is specially structured and arranged in cooperative configuration with certain components of the new apparatus 10 and system 12 to effectively and efficiently transfer the products 16 to the apparatus 10. In the embodiment shown in the figures, the singulator apparatus 10 connects to the conveyor assembly 28 utilizing one or more, typically a plurality, of splice plates 48, best shown in FIGS. 2 and 8-9, that are structured and arranged to safely, securely and effectively join the apparatus 10 to the conveyor assembly 28.

The singulator apparatus 10 of the present invention comprises one or more pairs, typically a plurality, of cylindrical assemblies 50 that are linearly aligned, as best shown in FIGS. 9-12, between the first or upstream end 52 of the singulator apparatus 10, which is connected to (directly or indirectly) the conveyor assembly 28 to receive the jumbled products 18, and the second or downstream end 54 of the singulator apparatus 10 that defines a product delivery area 55, which is where the singulated products 22 are directed to the processing area 26 or conveying and/or sorting system 14. For purposes of describing the apparatus 10 and system 12 of the present invention, the term "linearly aligned" is utilized to describe any adjacent cylindrical assemblies 50 that function as a pair as being parallel or substantially parallel to each other to define the singulation path 51 along which jumbled products 18 are singulated into singulate products 22 in the singulation area 24, as shown in FIGS. 9-12. As best shown in FIGS. 1-6, the product transfer area 44 is at the first/upstream end 52 of apparatus 10 and the product delivery area 55 is at the second/downstream end 54 of apparatus 10. As shown in FIGS. 2, 5 and 7-9, the location of the cylindrical assemblies 50 defines the singulation area 24 of the apparatus 10 and system 12 between the product transfer area 44 and the product delivery area 55.

Figure 8:
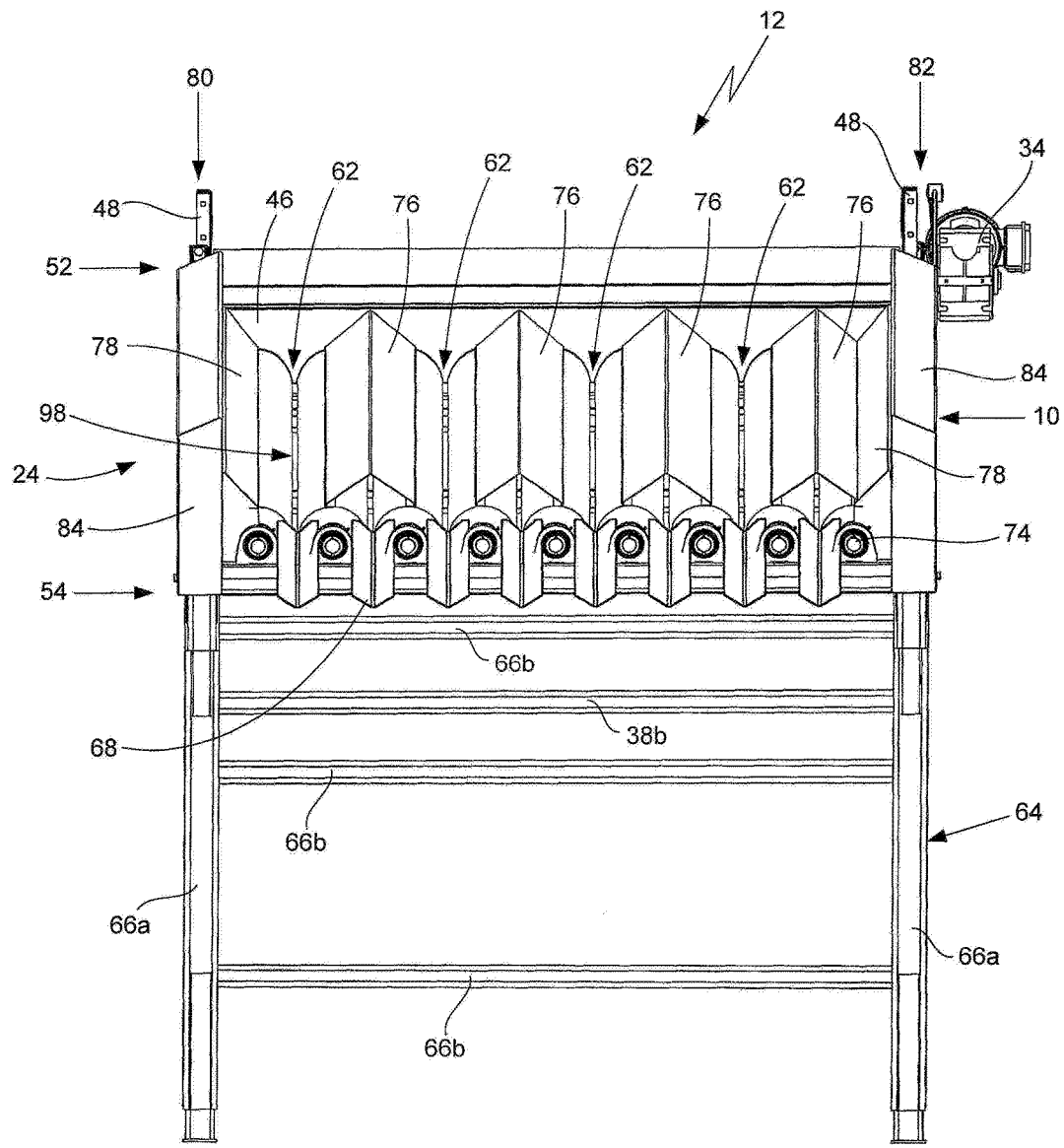
FIG. 8 is a front view of the cylinder singulator apparatus and system of FIG. 5
Figure 9:
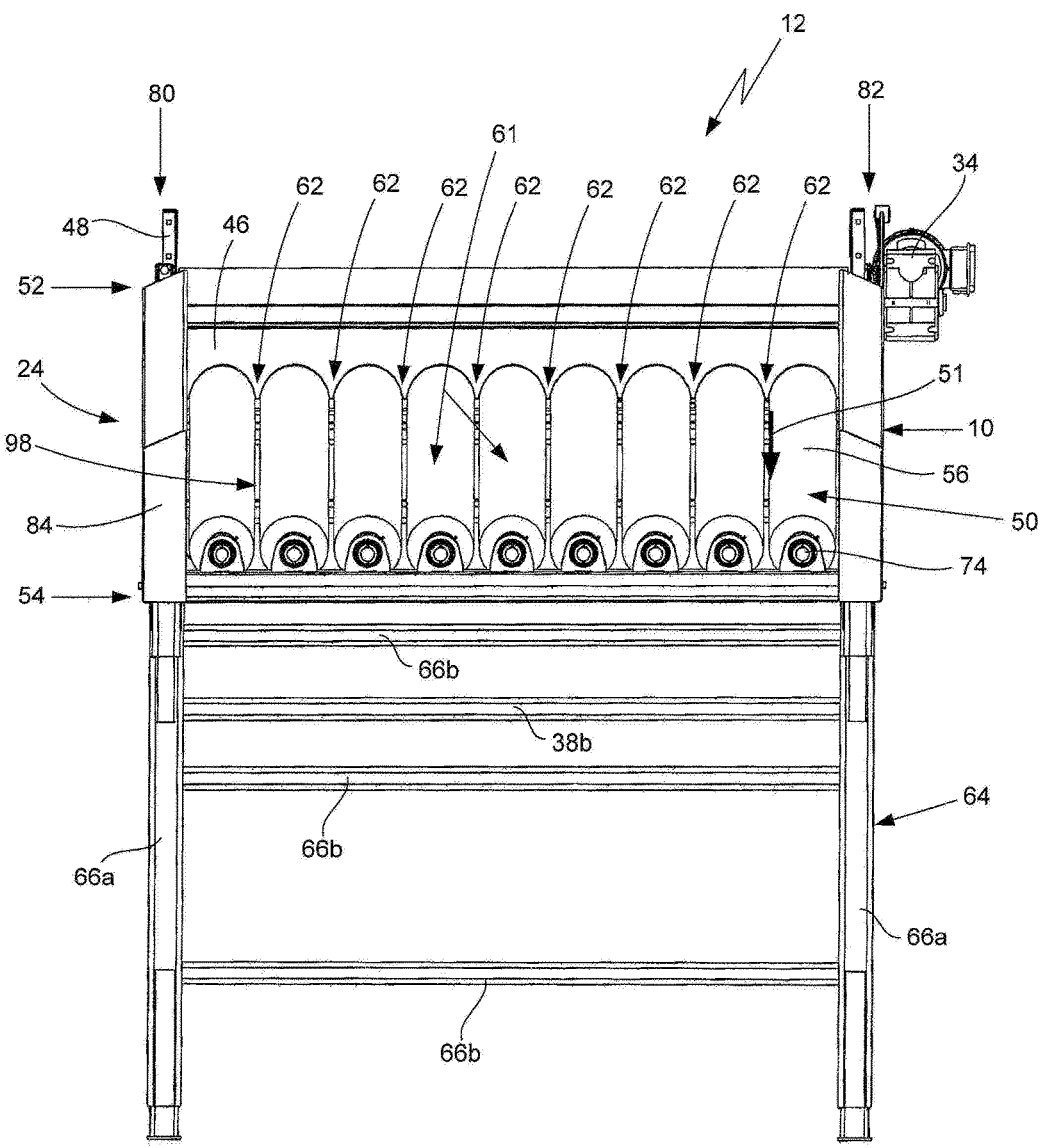
FIG. 9 is a front view of the cylinder singulator apparatus and system of FIG. 8 shown with the doghouses and delivery chutes removed.
Figure 10:
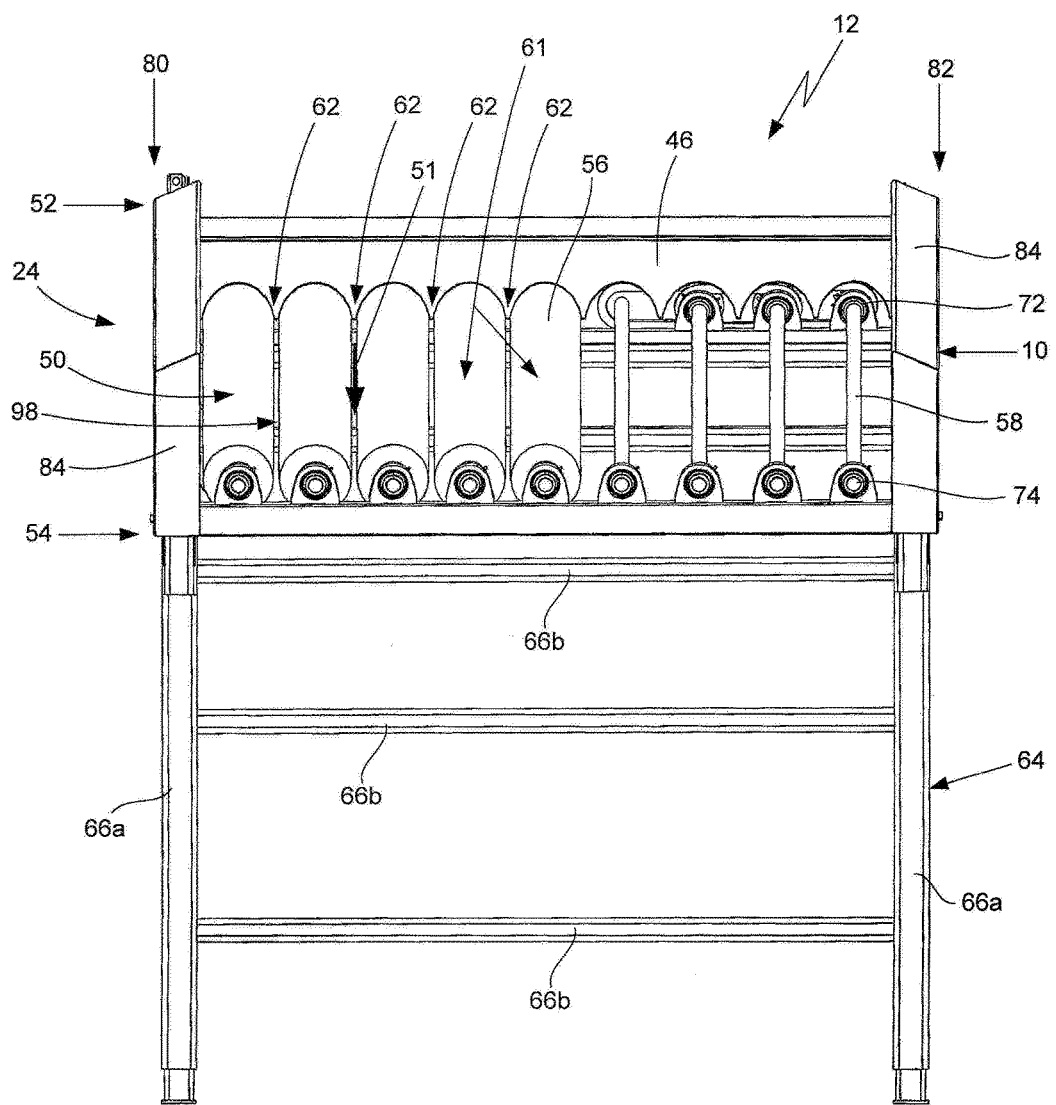
FIG. 10 is a front view of the cylinder singulator apparatus and system of FIG. 9 shown with the left four cylinders removed to better illustrate the idle shaft and bearings thereof.
Figure 11:
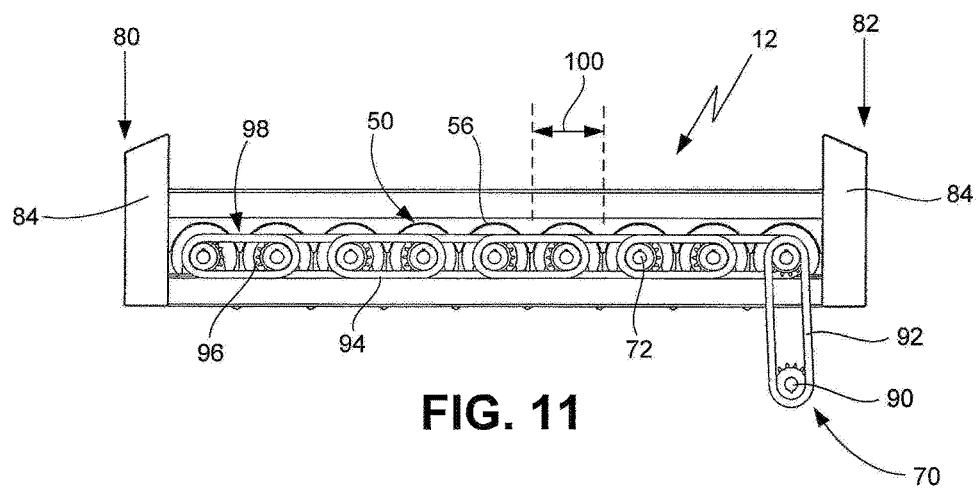
FIG. 11 is a back view of the cylinder singulator apparatus and system of FIG. 9 particularly showing the rotating mechanism utilized to rotate the cylinder assemblies.
Figure 12:
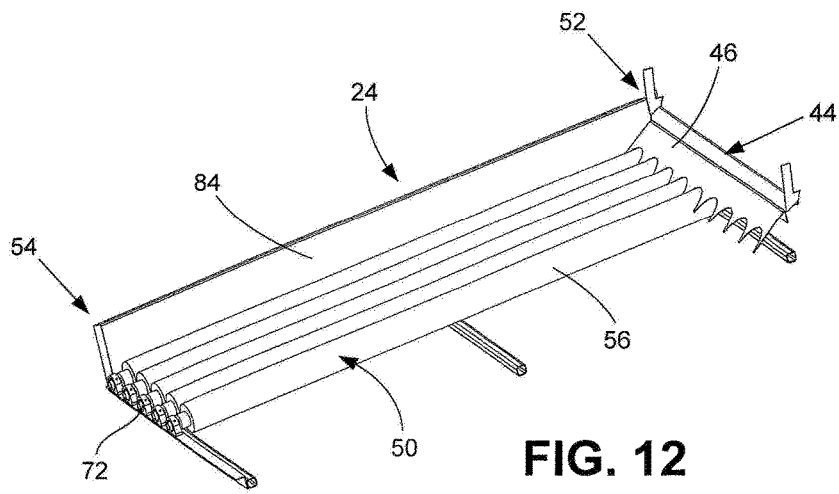
FIG. 12 is left side perspective view of the cylinder singulator apparatus and system of FIG. 10 shown without the left side rail and with the four left cylinder assemblies and bearings removed to better illustrate the cylinders and infeed delivery plate.
Figure 13:
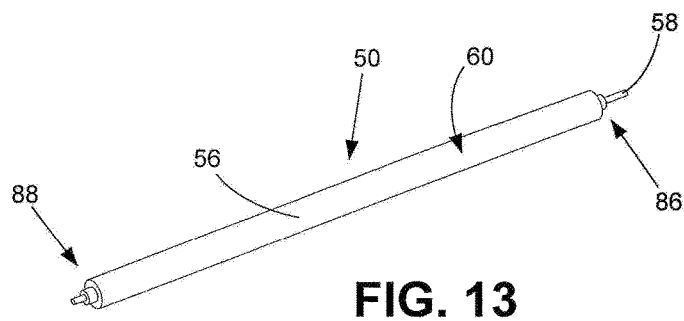
FIG. 13 is a left side perspective view of one of the cylinder assemblies.

Each cylindrical assembly 50 comprises a cylindrical member 56 and a shaft 58, as best shown in FIGS. 10-11 and 13, that are connected to each other or integrally formed such that rotation of a shaft 58 rotates the associated cylindrical member 56. In one configuration, the cylindrical members 56 have a surface 60 that is configured as a brush with a plurality of bristles. In another configuration, the surface 60 of the cylindrical members 56 is a hard, polished surface. To more efficiently and effectively singulate jumbled products 18, the cylindrical assemblies 50 operate as a pair of adjacent cylindrical assemblies 61, as shown in FIGS. 9-10. Each cylindrical assembly 50 is one of a pair of adjacent cylindrical assemblies 61 that define a valley 62, as best shown in FIGS. 8-10, between the two cylindrical assemblies 50 that define the singulation path 51 in which the jumbled products 18 are received and through which the products 16 become singulated products 22 prior to the products 16 being delivered to the processing area 26. Although each valley 62 could be utilized to singulate products 16, depending on various factors, including the size and type of product 16 being singulated, not every valley 62 will be a singulation path 51, as shown in FIGS. 1-2.

The new singulator apparatus 10 also comprises a frame 64 having a plurality of frame members 66, a delivery chute 68 associated with each valley 62 of each pair of cylindrical members 56, a rotating mechanism 70, a first bearing assembly 72, a second bearing assembly 74 and a plurality of product diverting members, such as the doghouses 76 and side plates 78, as best shown in FIGS. 1-3, 5 and 7-12. The frame 64 of the apparatus 10 comprises a plurality of frame members 66, including leg members 66a, transverse members 66b and linear members 66c, that support the apparatus 10 on the surface of the processing facility, as best shown in FIGS. 1, 3, 5 and 8. Each delivery chute 68 is associated with a valley 62 between a pair of adjacent cylindrical members 61 that are utilized or may be utilized to singulate jumbled products 18 into singulated products 22, as shown in FIGS. 1-3, 5 and 7-8. The delivery chutes 68 are utilized to direct the singulated products 22 to the processing area 26, as shown in FIGS. 1 and 2. The rotating mechanism 70, which is best shown in FIG. 11, is structured and arranged to rotate each cylindrical assembly 50, typically by rotating each shaft 58 that is connected to or integral with a cylindrical member 56. As best shown in FIG. 10, the first bearing assembly 72 is located at or near the first/upstream end 52 of the apparatus 10 and the second bearing assembly 74 is located at or near the second/downstream 54 of apparatus 10. In the figures, the rotating mechanism 70 is associated with the first bearing assembly 72. As well known in the art, the rotating mechanism 70 may be associated with the second bearing assembly 72 or elsewhere along one or more of the cylindrical assemblies 50. The doghouses 76 and side plates 78 are structured and arranged to direct the jumbled products 18 to and keep the singulated products 22 in the valleys 62 between the pair of cylindrical members 56 that are being utilized as a singulation path 51 to singulate the jumbled products 18 into singulated products 22, as best shown in FIGS. 1-3, 5 and 7-8. The side plates 78 may also be sized and configured to prevent product 16 from exiting out the first/right side 80 and second/left side 82 of the singulator apparatus 10, as best shown in FIGS. 1-3, 5 and 8. Side rails 84 at each side 80/82 of apparatus 10 are utilized to support and further define the singulation area 24, as best shown in FIGS. 1-3, 5 and 7-10. Side rails 84 are supported by the frame 64 of apparatus 10, as best shown in FIGS. 2 and 9.

Each cylindrical member 56 has a first or upstream end 86 and a second or downstream end 88, as best shown in FIG. 13. As set forth above, each cylindrical member 56 has a shaft 58 associated therewith, either attached to or integral therewith, with a portion of the shaft 58 extending beyond both the first/upstream end 86 and the second/downstream end 88 of each cylindrical member 56 to rotatably engage the first bearing assembly 72 and the second bearing assembly 74 at, respectively, the first/upstream end 52 and the second/downstream end 54 of the apparatus 10, as best shown in FIGS. 10 and 13. In the figures, the portion of the shaft 58 at the first/upstream end 86, which engages first the bearing assembly 72, is operatively engaged by the rotating mechanism 70, as best shown in FIG. 11, to rotate each of the cylindrical assemblies 50 in the singulation area 24 to efficiently and effectively "convert" the jumbled products 18 to singulated products 22, as shown in FIGS. 1 and 2. As well known in the art, the rotating mechanism 70 may engage the shaft 58 at the second/downstream end 88 or elsewhere along cylindrical assemblies 50.

The rotating mechanism 70 generally comprises a rotation producing device 90, such as a motor or the like, that is operatively connected to a primary rotating device 92 that is directly connected to and utilized, in the embodiment shown in the figures, to fully rotate one of the cylinder assemblies 50, and a plurality of secondary rotating devices 94 that operatively connect one cylindrical assembly 50 to another (typically adjacent) cylindrical assembly 50. Associated with each of the rotation producing device 90 and cylinder assembly 50 to connect to the primary 92 and secondary 94 rotating devices, is a cooperatively configured rotating device connector 96 that operatively connects the rotation producing device 90 to the primary rotating device 92, the primary rotating device 92 to one or more of the cylindrical assemblies 50 and the secondary rotating devices 94 that connect one cylindrical assembly 50 to another. In the embodiments shown in the figures, the rotation producing device 90 is an electric motor, the primary 92 and secondary 94 rotating devices are belts and the rotating device connector 96 is a belt sprocket. As will be readily appreciated by persons skilled in the relevant art, a wide variety of different types of motors 90, rotating devices 92/94 and rotating device connectors 96, as well as various combinations of such components, can be utilized with apparatus 10 and system 12 of the present invention. For instance, rotating producing device 90 can be a gas, diesel, hydraulic or pneumatic motor, rotating devices 92/94 can be chains or the other drive devices and rotating device connectors 96 can be chain sprockets or the like. As will also be readily appreciated by persons skilled in the art, these components will need to be sized and configured to support, transport and singulate the products 16 with which the apparatus 10 and system 12 will be utilized.

Depending on the products 16 to be singulated, the components of the rotating mechanism 70 can be structured and arranged to rotate the cylindrical assemblies 50 in the same direction (namely, clockwise or counterclockwise) or the rotating mechanism 70 can be structured and arranged such that two adjacent cylindrical assemblies 50, which define the valley 62 along which the products 16 move in singulation path 51 of singulation area 24, will counter-rotate relative to each other in clockwise/counterclockwise directions. In a preferred configuration, the cylindrical members 56 of each cylindrical assembly 50 are sized and configured and the cylindrical assemblies 50 are positioned in the singulation area 24 so as to be in spaced apart relation to each other to produce a gap 98 between the surfaces 60 of adjacent cylindrical members 56. In some circumstances, the gap 98 will be zero, meaning that the surface 60 of one cylindrical member 56 will be in contact (or even interlock or overlap slightly) the surface 60 of the adjacent cylindrical member 56, particularly with larger sized cylindrical members 56. In a preferred embodiment, however, the gap 98 will be greater than zero, such that the cylindrical members 56 do not touch, to reduce the amount of wear on the cylindrical members 56, specially those of the brush type. Typically, depending on the size and type of products 16, the gap 98 between a pair of adjacent cylindrical assemblies 50 will be somewhat small, such as 0.10 inch to 0.5 inch. For some products, such as a watermelon or the like, the gap 98 may be much larger.

As will be readily appreciated by persons skilled in the relevant art, the cylinder singulator apparatus 10 and system 12 of the present invention will be a universal singulator that can be utilized to singulate a wide variety of different products 16. The new apparatus 10 and system 12 may be able to eliminate the need for the shakers that are currently utilized in the product receiving area 20 to help singulate the products 16. In addition, the apparatus 10 and system 12 will more efficiently utilize the full width of the conveyor assembly 28 of the product receiving area 20, particularly relative to existing singulators. A wide variety of different configurations can be utilized for the new apparatus 10 and system 12 to more effectively, efficiently and rapidly singulate products. In addition to the size and type (i.e., brush, rollers or etc.) of cylindrical assemblies 50 and the gap 98 between cylindrical assemblies 50, the distance or spacing between adjacent pairs of cylindrical assemblies 50, as defined between the centerline of adjacent gaps 98 and which is identified as gap spacing 100 in FIG. 11, can be adjusted for different sizes and types of products 16. Another factor that can affect singulation of the products 16, depending on the size and configuration of the products 16, is the length of the cylindrical assemblies 50. These and other factors, which depend on the size and type of products 16, may also need to be adjusted depending on the configuration and type of equipment utilized in the processing area 26 downstream of the apparatus 10.

As set forth above, in the embodiment of the apparatus 10 shown in the figures, the apparatus 10 utilizes the doghouses 76 to help direct, with the infeed deliver plate 46, jumbled products 18 into the valleys 62 between pairs of adjacent cylindrical assemblies 50 and help keep the singulated products 22 in the valleys 62 so the singulated product 22 will be directed to the processing area 26, as best shown in FIGS. 1 and 2. In other embodiments, the doghouses 76 may not be utilized. When utilized, the doghouses 76 span over a gap 98 between the pairs of cylindrical assemblies 50 that are utilized to singulate the products 16, as best shown in FIGS. 2 and 8. With the doghouses 76 removed, as shown in FIG. 9, the jumbled product 18 will be directed into all of the gaps 98 between adjacent pairs of cylindrical assemblies 50. A configuration of the apparatus 10 without the doghouses 76 may be more suitable for use with certain types and/or sizes of products 16. For certain products 16, such as corn, cucumbers, bell peppers and certain variety of potatoes, the inventor has found that use of doghouses 76 allow the apparatus 10 to more effectively and efficiently singulate the products 16.

In one of the preferred configurations of the apparatus 10 and system 12 of the present invention, the cylindrical members 56 are brushes (such as standard trim cylinder brushes that have uniform fill over the entire brush surface 60) of the type which are commonly utilized for produce. The brushes of the cylindrical members 56 can be soft or hard, with soft brushes being generally easier on the produce and harder brushes providing better wear, but typically more likely to harm the produce. The brushes of the cylindrical members 56 can provide a surface 60 that is useful for removing blooms from the produce, which is commonly necessary for organic produce. If desired, one or more spray bars can be added to the apparatus 10 and system 12 to provide a washing system that washes the product 16, specially produce, as the product 16 is being singulated by the rotating movement of the cylindrical assemblies 50. The brushes of cylindrical members 56, the filaments of which may be made out of horsehair or a wide variety of other materials, can be configured to wick any excess water. To further facilitate wicking away of excess water, one or more sponges or sponge-like material can be added to the cylindrical members 56.

In an alternative embodiment, the new singulator apparatus 10 of the present invention can include a tilt mechanism (not shown) that is structured and arranged to allow the operator to change the angle of the cylindrical assemblies 50 by raising or lowering either the first/upstream end 52 of the apparatus 10 and/or the second/downstream end 54 of the apparatus 10. The tilt mechanism, the use and configuration of which are well known in the relevant art, can be utilized to either speed up or slow down the movement of the singulated products 22 as they move through the singulation area 24.

While there are shown and described herein a specific form of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there are numerous components described herein that can be replaced with equivalent functioning components to accomplish the objectives of the present invention.

What is claimed is:

1. A cylinder singulator apparatus for singulating a plurality of jumbled products into a plurality of singulated products so each product thereof may be further processed in a processing area of a product conveying and/or sorting system, said apparatus comprising:

a product transfer area at a first end of said apparatus, said product transfer area structured and arranged to receive the plurality of jumbled products;

a product delivery area at a second end of said apparatus, said product delivery area structured and arranged to deliver the plurality of singulated products to the processing area;

a singulation area disposed between said product transfer area and said product delivery area, said singulation area having a plurality of cylindrical assemblies between said first end and said second end of said apparatus so as to define one or more pairs of adjacent cylindrical assemblies, each of said cylindrical assemblies having a cylindrical member, each of said pair of adjacent cylindrical assemblies being linearly aligned to define a valley that is sized and configured to receive the plurality of jumbled products and for said cylindrical members of said pair of adjacent cylindrical assemblies to rotatably engage each of the products to singulate and separate the products to produce the plurality of singulated products and to move the plurality of singulated products along a singulation path to said product delivery area; and a rotating mechanism operatively connected to each of said cylindrical assemblies so as to rotate said cylindrical assemblies, said rotating mechanism having a rotation producing device configured to produce rotating motion and one or more rotating devices operatively interconnecting said rotation producing device and said cylindrical assemblies so as to rotate one or more of said cylindrical assemblies upon rotation of said rotating producing device.

2. The apparatus of claim 1, wherein said apparatus further comprises a support frame having one or more frame members.

3. The apparatus of claim 1, wherein said product transfer area comprises one or more infeed delivery plates.

4. The apparatus of claim 3, wherein each of said infeed delivery plates are sized and configured to direct the plurality of jumbled products into one or more of said valleys between said pair of adjacent cylindrical assemblies.

5. The apparatus of claim 1, wherein said product delivery area comprises a delivery chute associated with at least one of said valleys between said pair of adjacent cylindrical assemblies so as to receive said singulated products from said singulation area.

6. The apparatus of claim 1, wherein each of said cylindrical assemblies comprises a shaft attached to or integral with said cylindrical member thereof, said rotating mechanism operatively connected to said shaft so as to rotate said cylindrical member.

7. The apparatus of claim 6 further comprising a bearing assembly associated with at least one of a first end and a second end of each of said cylindrical assemblies, each of said bearing assemblies supported by one or more frame members of a frame of said apparatus and configured to allow each of said cylindrical assemblies to rotate relative to said frame.

8. The apparatus of claim 1, wherein said rotating mechanism further comprises a rotating device connector associated with each of said rotation producing device, said rotating devices and said cylindrical assemblies so as to transfer rotating motion from said rotation producing device to said cylindrical assemblies.

9. The apparatus of claim 1 further comprising one or more doghouses, each of said doghouses structured and arranged to direct the plurality of jumbled products into said valleys between one of said pairs of adjacent cylindrical assemblies and to keep the plurality of singulated products in one of said valleys.

10. A cylinder singulator apparatus for singulating a plurality of jumbled products into a plurality of singulated products so each product thereof may be further processed in a processing area of a product conveying and/or sorting system, said apparatus comprising:
 a product transfer area at a first end of said apparatus, said product transfer area structured and arranged to receive the plurality of jumbled products, said product transfer area having one or more infeed delivery plates;
 a product delivery area at a second end of said apparatus, said product delivery area structured and arranged to deliver the plurality of singulated products to the processing area;
 a singulation area disposed between said product transfer area and said product delivery area, said singulation area having a plurality of cylindrical assemblies between said first end and said second end of said apparatus so as to define one or more pairs of adjacent cylindrical assemblies, each of said cylindrical assemblies having a cylindrical member and a shaft attached to or integral with said cylindrical member, each of said pair of adjacent cylindrical assemblies being linearly aligned to define a valley that is sized and configured to receive the plurality of jumbled products and for said cylindrical members of said pair of adjacent cylindrical assemblies to rotatably engage each of the products to singulate and separate the products to produce the plurality of singulated products and to move the plurality of singulated products along a singulation path to said product delivery area, each of said one or more infeed delivery plates configured to direct the jumbled product to one or more valleys between said pair of adjacent cylindrical assemblies; and
 a rotating mechanism operatively connected to said shaft of each of said cylindrical assemblies so as to rotate each of said cylindrical assemblies, said rotating mechanism having a rotation producing device configured to produce rotating motion and one or more rotating devices operatively interconnecting said rotation producing device and said shaft of each of said cylindrical assemblies so as to rotate said cylindrical assemblies upon rotation of said rotating producing device.

11. The apparatus of claim 10, wherein said product delivery area comprises a delivery chute associated with at least one of said valleys between said pair of adjacent cylindrical assemblies so as to receive said singulated products from said singulation area.

12. The apparatus of claim 10, wherein said apparatus further comprises a support frame having one or more frame members.

13. The apparatus of claim 10 further comprising a bearing assembly associated with at least one of a first end and a second end of each of said cylindrical assemblies, each of said bearing assemblies supported by one or more frame members of a frame of said apparatus and configured to allow each of said cylindrical assemblies to rotate relative to said frame.

14. The apparatus of claim 10, wherein said rotating mechanism further comprises a rotating device connector associated with each of said rotation producing device, said rotating devices and said cylindrical assemblies so as to transfer rotating motion from said rotation producing device to said cylindrical assemblies.

15. A system for singulating and separating a plurality of jumbled products into a plurality of singulated products so each product thereof may be further processed, said system comprising:
 a conveyor assembly with a conveyor defining a product receiving area for receiving the plurality of jumbled products;
 a processing area for processing the plurality of singulated products; and
 a singulator apparatus disposed between said conveyor assembly and said processing area, said singulator apparatus having a product transfer area at a first end of said apparatus, a product delivery area at a second end of said apparatus, a singulation area disposed between said product transfer area and said product delivery area and a rotating mechanism associated with said singulation area, said product transfer area structured and arranged to receive the plurality of jumbled products from said conveyor assembly, said product delivery area structured and arranged to deliver the plurality of singulated products to said processing area, said singulation area having plurality of cylindrical assemblies between said first end and said second end of said apparatus that define one or more pairs of adjacent cylindrical assemblies, each of said cylindrical assemblies having a cylindrical member, each of said pair of adjacent cylindrical assemblies being linearly aligned to define a valley that is sized and configured to receive the plurality of jumbled products and for said cylindrical members of said pair of adjacent cylindrical assemblies to rotatably engage each of the products to singulate and separate the products to produce the plurality of singulated products and to move the plurality of singulated products along a singulation path to said product delivery area, said rotating mechanism operatively connected to each of said cylindrical assemblies so as to rotate said cylindrical assemblies, said rotating mechanism having a rotation producing device configured to produce rotating motion and one or more rotating devices operatively interconnecting said rotation producing device and said cylindrical assemblies so as to rotate one or more of said cylindrical assemblies upon rotation of said rotating producing device.

16. The system of claim 15, wherein each of said cylindrical assemblies comprises a shaft attached to or integral with said cylindrical member thereof, said rotating mechanism operatively connected to said shaft so as to rotate said cylindrical member.

17. The system of claim 16 further comprising a bearing assembly associated with at least one of a first end and a second end of each of said cylindrical assemblies, each of said bearing assemblies configured to allow each of said cylindrical assemblies to rotate.

18. The system of claim 15, wherein said rotating mechanism further comprises a rotating device connector associated with each of said rotation producing device, said rotating devices and said cylindrical assemblies so as to transfer rotating motion from said rotation producing device to said cylindrical assemblies.

* * * * *